(12) United States Patent
Shiina et al.

(10) Patent No.: US 11,118,995 B2
(45) Date of Patent: Sep. 14, 2021

(54) GAS-TIGHT PLUG

(71) Applicant: SANOH INDUSTRIAL CO., LTD., Tokyo (JP)

(72) Inventors: Mitsuharu Shiina, Ibaraki (JP);
Miyuki Takahashi, Ibaraki (JP);
Kazuyuki Haraga, Ibaraki (JP);
Hideharu Shimura, Osaka (JP);
Yasuyuki Kunugiza, Osaka (JP);
Yorichika Takizawa, Osaka (JP)

(73) Assignee: SANOH INDUSTRIAL CO., LTD., Tokyo (JP)

(*) Notice: Subject to any disclaimer, the term of this patent is extended or adjusted under 35 U.S.C. 154(b) by 178 days.

(21) Appl. No.: 16/483,259

(22) PCT Filed: Mar. 7, 2018

(86) PCT No.: PCT/JP2018/008698
§ 371 (c)(1),
(2) Date: Aug. 2, 2019

(87) PCT Pub. No.: WO2018/198539
PCT Pub. Date: Nov. 1, 2018

(65) Prior Publication Data
US 2020/0011759 A1 Jan. 9, 2020

(30) Foreign Application Priority Data
Apr. 26, 2017 (JP) .............................. JP2017-087708

(51) Int. Cl.
*G01M 3/02* (2006.01)
*F16L 55/11* (2006.01)
*G01M 3/28* (2006.01)

(52) U.S. Cl.
CPC ............. *G01M 3/022* (2013.01); *F16L 55/11* (2013.01); *G01M 3/2815* (2013.01)

(58) Field of Classification Search
CPC ......... F16L 55/132; F16L 55/11; G01M 3/022
USPC ................................... 138/89; 123/469, 456
See application file for complete search history.

(56) References Cited

U.S. PATENT DOCUMENTS 6,062,200 A * 5/2000 Hofmeister .......... F02M 69/465
123/470
6,640,784 B1 * 11/2003 Sims, Jr. .............. F02M 69/045
123/470
7,293,549 B2 * 11/2007 Kaishio ................. F16L 55/132
123/456

(Continued)

*Primary Examiner* — Patrick F Brinson
(74) *Attorney, Agent, or Firm* — Posz Law Group, PLC

(57) ABSTRACT

A gas-tight plug is attachable by pressing it against an opening portion of a hollow component, the gas-tight plug being inserted into the opening portion using the force of pressing to be automatically aligned so that if the positions of a plurality of opening portions vary within an allowable tolerance, the axial directions of all the opening portions and the axial directions of the respective gas-tight plugs are automatically caused to coincide. A gas-tight plug includes an end portion, a contact part of a base portion end of the gas-tight plug coming into contact with a base of the pressing mechanism has a circular flat surface coaxial with the end portion, and the circular flat surface has a diameter more than 0.12 times and less than 0.2 times a total length of the gas-tight plug.

4 Claims, 7 Drawing Sheets

(56) References Cited

U.S. PATENT DOCUMENTS

| | | | |
|---|---|---|---|
| 8,602,064 B2 * | 12/2013 | Yoneda | F04B 39/123 |
| | | | 138/89 |
| 9,765,915 B2 * | 9/2017 | Kutzinsky | F16L 55/1125 |
| 2006/0180125 A1 * | 8/2006 | Kaishio | F16L 55/132 |
| | | | 123/456 |

* cited by examiner

GAS-TIGHT PLUG

CROSS REFERENCE TO RELATED APPLICATIONS

This application is a U.S. national stage of International Patent Application No. PCT/JP2018/008698 filed on Mar. 7, 2018 and is based on Japanese Patent Application No. 2017-087708 filed on Apr. 26, 2017, the disclosures of which are incorporated herein by reference.

TECHNICAL FIELD

The present invention relates to gas-tight plugs that detachably and hermetically close an opening portion of a hollow component, and particularly to a gas-tight plug used for a gas-tightness inspection device that closes an opening portion branched from a pipe with the gas-tight plug to perform a gas-tightness inspection of the pipe. More particularly, the present invention relates to a gas-tight plug used in an inspection device for gas-tightness inspection performed before shipment of a fuel delivery pipe having an injector cup as an opening portion.

BACKGROUND ART

The fuel delivery pipe is a metal pipe for feeding fuel to an injector attached to a cylinder head of an internal combustion engine, and is provided with one fuel inlet and typically a plurality of injector cups. In use, the injector is inserted into the injector cup. The plurality of injector cups are manufactured to be attached to the pipe body of the fuel delivery pipe by brazing or the like. Further, all fuel delivery pipes are shipped after gas-tightness inspection after manufacturing and before shipment.

In a gas-tightness inspection performed before shipping of the fuel delivery pipe provided with the plurality of injector cups, the gas-tightness inspection includes, for example, hermetically closing the fuel supply port of the fuel delivery pipe; closing all the plurality of injector cups with a gas-tight plug except for one of the plurality of injector cups; closing the other injector cup with a gas-tight plug for test fluid introduction inside which a fluid passage is provided in order to flow a test fluid in the fuel delivery pipe from the other injector cup; pressure-feeding the test fluid into the fuel delivery pipe in the closed state; and then measuring a time-dependent change of the internal pressure and the like.

PTL 1 discloses a leak test device for an injector attachment portion, which is a device for testing a leak from an attachment hole of an injector in a cylinder head. The device includes an annular pad for closing the opening periphery of the attachment hole; a rod for closing the injection hole of the injector which is disposed at the center of the pad; and an air supply passage for supplying compressed air to the injector side from between the pad and the rod, wherein a leak of the supplied compressed air is detected in comparison with a predetermined set pressure by an air leak tester.

Further, PTL 2 discloses a seal structure of a pipe body in which an annular seal member seals between an opening portion of the pipe body having a reduced diameter portion therein at an appropriate distance from the end of the opening portion and an attachment member inserted into the opening portion, the annular seal member being fitted with a shaft portion of the attachment member, and in order to increase the gas-tightness, a bush is fitted to an end portion of the shaft portion movably in the axial direction; the annular seal member is fitted movably between the base portion and the bush; a small diameter portion is formed at an end portion of the shaft portion on the bush side in a movement area of the annular seal member; a large diameter portion is formed at the base portion side of the shaft portion; the shaft portion of the attachment member is inserted into the pipe body from the end of the opening of the pipe body; the bush is moved toward the base portion of the shaft portion with the bush coming into contact with the reduced diameter portion of the pipe body; and the annular seal member is moved from the small diameter portion of the shaft portion to the large diameter portion by the bush, so that the annular seal member is expanded and deformed in a direction of the inner peripheral surface of the opening portion, thereby pressing the annular seal member against the inner peripheral surface of the pipe body.

CITATION LIST

Patent Literature

[PTL 1] Japanese Patent Application Publication No. H11-37884
[PTL 2] Japanese Patent Application Publication No. 2006-220242

SUMMARY OF INVENTION

Technical Problem

PTL 1 mentioned above indicates that: in recent years, the production of gasoline engines that directly inject fuel into the cylinder, as well as diesel engines, is realized as direct injection gasoline engines; this allows the fuel injection timing to be greatly changed depending on the operating condition of the engine and thus to reduce exhaust fluid with the performance of the engine improved; and since the injector of the engine receives combustion pressure directly, which is different from the injector of the MPI (multi-point injection) engine which is attached to the intake manifold, it is important to ensure the sealing ability on the sheet surface, that is, it is necessary to predict defects such as pits and scratches on the sheet surface. Furthermore, it indicates that when high pressure air is supplied to the attachment portion to perform the above-described leak test for the attachment portion, the air may leak from the injection hole into the injector, thereby causing a measurement error.

PTL 1 discloses, as a means for solving this problem, the leak test device for an injector attachment portion focusing on the structure of the annular pad, the rod closing the injection hole, and the air supply passage.

PTL 2 mentioned above discloses that: a plurality of injector cups may be fixed to the pipe body of the fuel delivery pipe by brazing; there are variations in attaching the brazed pipe body and the like on the injector cups; and a gas-tightness inspection is performed to check the gas-tightness of the pipe body by injecting air with a predetermined pressure into the pipe body with all the opening portions of the pipe body closed with the gas-tight plug and by measuring the internal pressure with a pressure gauge after a predetermined time.

PTL 2 also proposes a seal structure of a pipe body in which the injector cup can be closed simply by pressing the injector cup against the gas-tight plug without using screwing with a nut. Furthermore, the gas-tight plug disclosed in PTL 2 is configured to close the injector cup by relatively pressing the injector cup against the gas-tight plug and to be pulled out simply by relatively pulling it. When the injector cup and the gas-tight plug are attached in close contact with each other, the axis of the injector cup and the axis of the gas-tight plug need to coincide. This is because if the axes do not coincide with each other, the gas-tightness cannot be maintained. This means that when attaching the injector cup and the gas-tight plug, one must be pressed against the other one with their axes coinciding with each other.

In the conventional gas-tightness inspection device for a fuel delivery pipe having an injector cup, the position and the axial direction of the gas-tight plug are fixed by the main body of the gas-tightness inspection device, as disclosed in PTL 1 and PTL 2 described above. For example, in PTL 2, the flange portion of the base portion end of the gas-tight plug is formed into a wide planar shape, and its flat surface is disposed in close contact with a wide planar base of the main body of the gas-tightness inspection device. The injector cup is relatively pressed against the gas-tight plug whose position and direction are fixed, and the gas-tight plug is attached to the injector cup.

Normally, a plurality of injector cups are fixed to a fuel delivery pipe, which is a common pipe, for example, by brazing. Therefore, the positions of the plurality of injector cups vary within an allowable tolerance (for example, a degree of position ϕ of 0.4).

If the positions of the plurality of injector cups vary even within the range of the allowable tolerance, when the injector cup is pressed against the conventional gas-tight plug whose axial direction is fixed to the main body of the gas-tightness inspection device, it is not possible to cause the axes of the gas-tight plugs and the axial directions of all the injector cups to coincide at the same time.

An object of the present invention is to propose a gas-tight plug that is attachable simply by pressing it against an opening portion of a hollow component, the gas-tight plug being inserted into the opening portion using the force of pressing to be automatically aligned so that if the positions of a plurality of opening portions vary within an allowable tolerance, the axial directions of all the opening portions and the axial directions of the respective gas-tight plugs are automatically caused to coincide.

Solution to Problem

To solve the above-described problems, the present invention is directed to a gas-tight plug defined in the following [1] to [4].

[1] A gas-tight plug, including an end portion which is hermetically attached to an opening portion of a hollow component by pressing against the opening portion by a pressing mechanism and is separated from the opening portion by pulling, wherein a contact part of a base portion end of the gas-tight plug coming into contact with a base of the pressing mechanism has a circular flat surface or a spherical surface coaxial with the end portion; if the contact part has the circular flat surface, the circular flat surface has a diameter W more than 0.12 times and less than 0.2 times a total length L of the gas-tight plug; and if the contact part has the spherical surface, the spherical surface has a radius of curvature R larger than the total length L of the gas-tight plug.

[2] The gas-tight plug according to the above [1], wherein a chamfered portion is formed by tapering on an end shoulder portion of the gas-tight plug.

[3] The gas-tight plug according to the above [1], the gas-tight plug including a housing; a cylinder held by the housing; a piston axially movable in the cylinder; and an O-ring fitted between an end of the piston and an end of the cylinder, wherein the piston is movable by the action of a working fluid, and when the piston moves so that the end of the piston presses the O-ring to the cylinder side, the O-ring is axially compressed and radially expanded.

[4] The gas-tight plug according to the above [1], wherein the hollow component is a fuel delivery pipe, and the opening portion is an injector cup attached to the fuel delivery pipe by brazing.

Advantageous Effects of Invention

According to the gas-tight plug of the present invention described above, wherein when there is a deviation between a position of the opening portion and a position of the gas-tight plug, the gas-tight plug is tilted so that the base end portion of the gas-tight plug is in line contact or point contact with the base, and when the opening portion is relatively pressed against the gas-tight plug, the line contact portion or the point contact portion moves on the surface of the base end portion so that the axial direction of the opening portion and the axial direction of the gas-tight plug coincide with each other. As a result, by relatively pressing the base toward the opening portion, the base is pressed in a state where the axis of the opening portion and the axis of the gas-tight plug coincide with each other, and the gas-tight plug is detachably attached to the opening portion. As described above, by alignment using the force of inserting the gas-tight plug into the opening portion, it is possible to improve the inspection accuracy without an increased cost of the entire device and a complicated inspection process. In addition, since the force required for the alignment can be small, defects such as deformation, scratches, and positional deviation due to the inspection process are not caused in the hollow component as the object to be inspected.

DESCRIPTION OF EMBODIMENTS

Embodiments of a gas-tight plug and a gas-tightness inspection device for a hollow component using the gas-tight plug according to the present invention will be described in detail with reference to the drawings.

Figure 1:
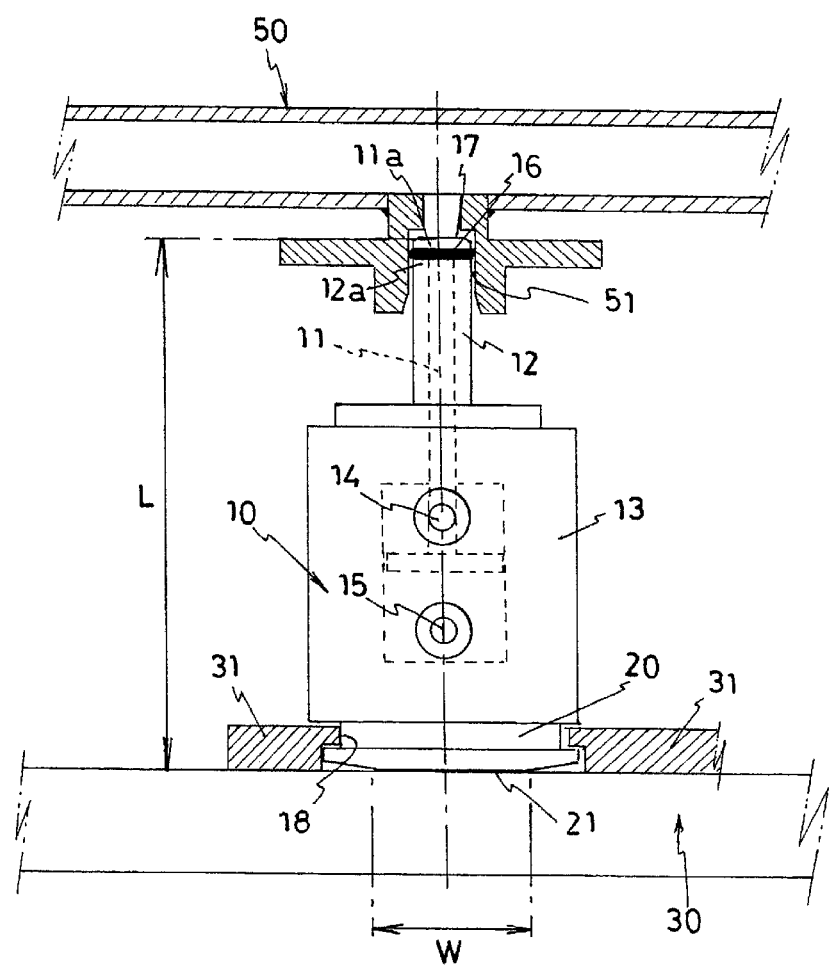
FIG. 1 is a conceptual side view of a gas-tight plug according to a preferred embodiment of the present invention.

FIG. 1 is a conceptual view of a gas-tight plug according to a preferred embodiment of the present invention. A gas-tight plug 10 is hermetically attached to an opening portion 51 of a hollow component 50 to be closed by pressing against the opening portion 51, and is separated from the opening portion 51 by pulling.

The structure of the illustrated gas-tight plug 10 is as follows.

At an end portion of the gas-tight plug 10, a piston 11 is disposed, and the piston 11 is movable in a cylinder 12 in its axial direction. The cylinder 12 is held by a housing 13, and the piston 11 moves in the cylinder 12 by introducing and discharging a working fluid to and from the cylinder 12 via working fluid ports 14 and 15. An O-ring 16 is attached between an end portion 11a of the piston 11 and an end portion 12a of the cylinder 12. When the piston 11 moves so that the end portion 11a of the piston presses the O-ring 16 to the cylinder 12 side, the O-ring 16 is axially compressed and radially expanded, and is strongly pressed against an inner wall surface of the opening portion 51. A chamfered portion 17 is formed by tapering on an end shoulder portion of the gas-tight plug 10, that is, an end peripheral edge of the piston 11. The reason for forming the chamfered portion 17 will be described later.

The gas-tight plug 10 according to the present invention is characterized in the structure of a base portion end 20 of the gas-tight plug.

In the embodiment of FIG. 1, the base portion end 20 of the gas-tight plug 10 is tapered to reduce its diameter so that a circular flat portion 21 with a diameter W is formed. A base 30 supporting the gas-tight plug 10 supports the gas-tight plug 10 in contact with the circular flat portion 21 of the base portion end 20. The size and function of the diameter W of the circular flat portion 21 will be described later.

Figure 2:
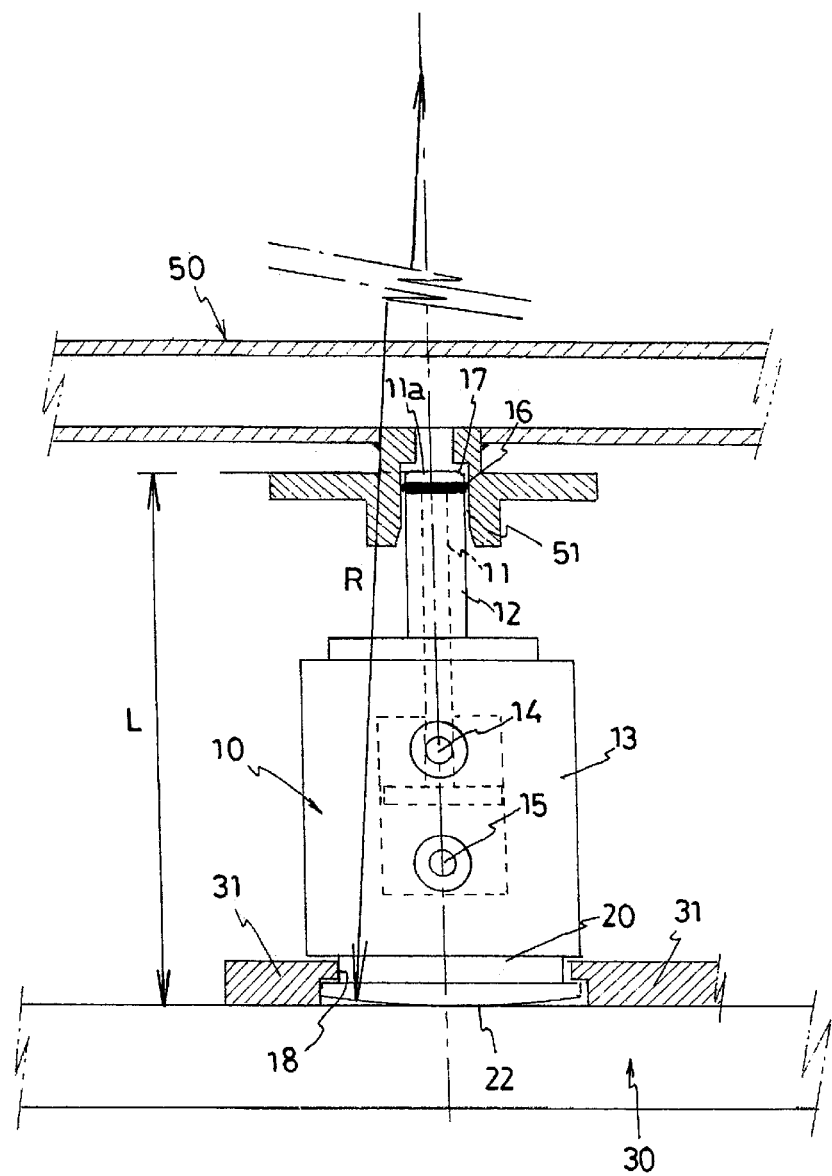
FIG. 2 is a conceptual side view of a gas-tight plug according to another preferred embodiment of the present invention.

FIG. 2 is a conceptual view illustrating a gas-tight plug according to another preferred embodiment of the present invention.

The gas-tight plug 10 illustrated in FIG. 2 also includes the piston 11, the cylinder 12, and the like, and is configured to compress the attached O-ring 16 by the piston 11 and strongly press the inner wall surface of the opening portion 51. In addition, the chamfered portion 17 is formed on the end shoulder portion of the gas-tight plug 10 by tapering.

In the gas-tight plug 10 according to the embodiment of FIG. 2, unlike the embodiment of FIG. 1, the base portion end 20 of the gas-tight plug 10 is formed into a spherical portion 22 with a radius of curvature R, and the spherical portion 22 comes into point contact with the base 30. The spherical portion 22 may have a micro flat portion (W≤0.016L) at the lowermost end. The size and function of the radius of curvature R of the spherical portion 22 will be described later. It is noted that in FIG. 2, the same members and parts as those in FIG. 1 are represented by the same reference numerals, and the description thereof will be omitted accordingly.

Figure 3:
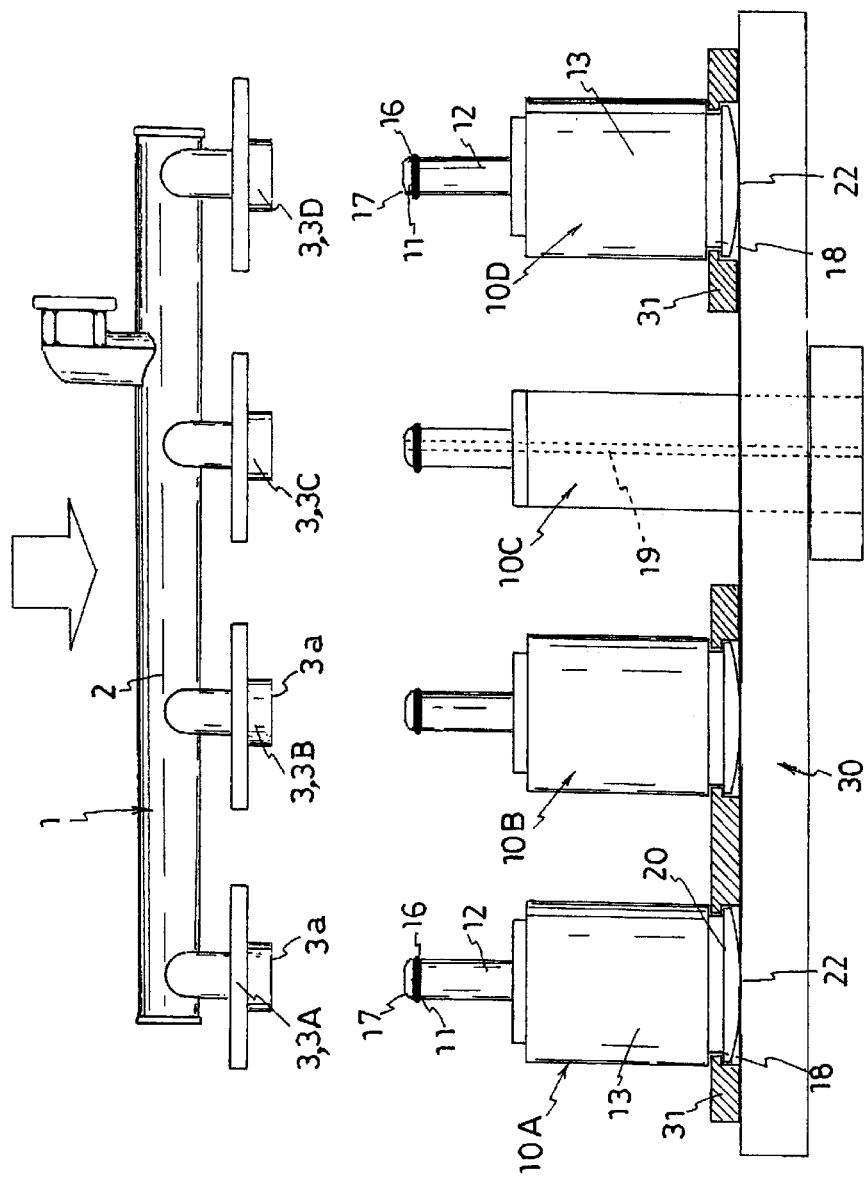
FIG. 3 is a conceptual side view illustrating a relationship between a fuel delivery pipe and a gas-tight plug in the case of performing a gas-tightness inspection on the fuel delivery pipe which is the target of the gas-tightness inspection by using a gas-tightness inspection device.

FIG. 3 is a conceptual view illustrating a relationship between a fuel delivery pipe 1 and the gas-tight plug 10 in the case where a gas-tightness inspection is performed on the fuel delivery pipe as the hollow component 50 which is the target of the gas-tightness inspection by a gas-tightness inspection device.

The fuel delivery pipe 1 is a metal pipe for feeding fuel to an injector attached to a cylinder head of an internal combustion engine, and includes a pipe body 2 and a plurality of injector cups 3 (four injector cups 3A, 3B, 3C, and 3D in the illustrated example). An injector is originally inserted into an opening end 3a of the injector cup 3 and used. The plurality of injector cups 3 are attached to the fuel delivery pipe 1 by brazing or the like. Since the fuel delivery pipe is a pipe for feeding fuel and has a plurality of brazing points, a gas-tightness inspection is performed after manufacturing to check that the gas-tightness is secured.

The embodiment of FIG. 3 provides the gas-tight plug 10 according to the present invention illustrated in FIG. 1 or FIG. 2 in which three gas-tight plugs 10A, 10B, and 10D of the four gas-tight plugs 10A, 10B, 10C, and 10D each include the piston 11 which is disposed at the end and is to be fitted in the injector cup 3, the cylinder 12 inside which the piston 11 is slid, and a housing 13 for holding the cylinder 12. The gas-tight plug 10 is configured to compress the attached O-ring 16 by the piston 11 and strongly press it against the inner wall surface of the injector cup 3. A notch 18 is formed in the lower peripheral wall of the housing 13 located at the base portion end 20 of the gas-tight plug 10, and the movement of the gas-tight plug 10 on the surface of the base 30 is regulated by a position restricting member 31 loosely engaged with the notch 18. The position restricting member 31 will be described later.

Figure 4:
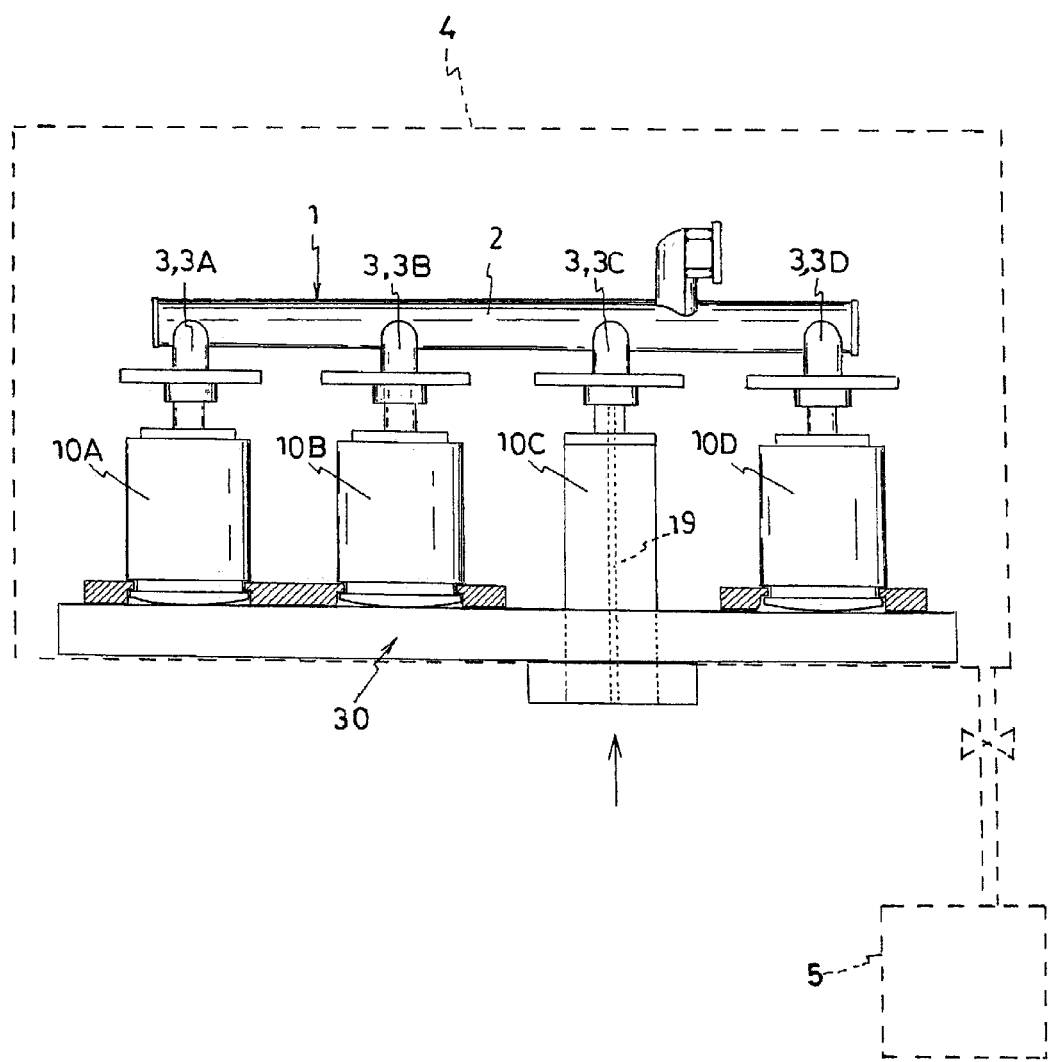
FIG. 4 is a conceptual side view of the gas-tightness inspection device for the fuel delivery pipe.

FIG. 4 is a conceptual view of the gas-tightness inspection device for the fuel delivery pipe.

In the illustrated gas-tightness inspection device, the three injector cups 3A, 3B, and 3D of the four injector cups 3 of the fuel delivery pipe 1 are hermetically closed by the gas-tight plugs 10A, 10B, and 10D according to the present invention as described above, and the remaining one injector cup 3C is hermetically closed using a gas-tight plug 10C for test fluid introduction having a fluid passage 19. After the four injector cups are hermetically closed in this manner, a high-pressure test fluid (for example, helium gas with 25 MPa) is fed into the fuel delivery pipe 1 through the fluid passage 19 of the gas-tight plug 10C for test fluid introduction so that the inside of the fuel delivery pipe 1 is in a pressurized state, and the gas-tightness of the fuel delivery pipe 1 is then checked by detecting the amount of leakage of the test fluid by a leak detector 5 connected to a chamber 4 which surrounds the periphery.

FIG. 3 conceptually illustrates a relationship between the fuel delivery pipe 1 and the gas-tight plug 10 immediately before the gas-tightness inspection. The gas-tight plugs 10A, 10B, and 10D according to the present invention are placed on the base 30 of the gas-tightness inspection device in a state where the gas-tight plugs slightly movably restricted by the position restricting member 31, and the gas-tight plug 10C for test fluid introduction having the fluid passage 19 penetrates the base 30 and is fixed to the base.

Figure 5:
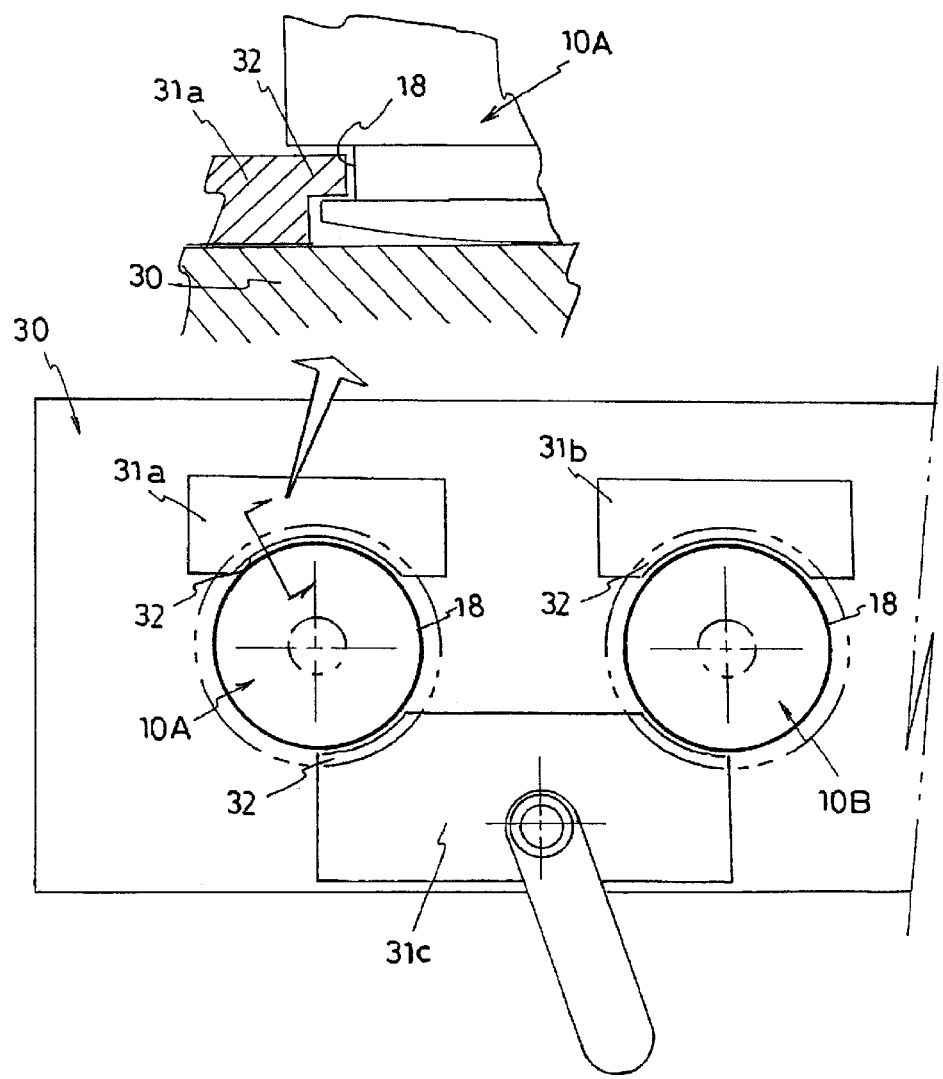
FIG. 5 is a plan view and an enlarged view of main parts illustrating an example of the configuration of a position restricting member of the gas-tight plug.

FIG. 5 is a conceptual view illustrating a configuration example of the position restricting member 31. The position restricting member 31 has a configuration in which the peripheries of the two gas-tight plugs 10A and 10B are supported by three members 31a, 31b, and 31c each having a hook-like cross section. A hook portion 32 of each member is loosely engaged with the notch 18 provided in the gas-tight plug 10 with a gap therebetween, and the positions of the gas-tight plugs 10A and 10B on the surface of the base 30 are restricted with a margin so that the base portion ends 20 of the gas-tight plugs 10A and 10B supported on the base 30 can slightly move along the upper surface of the base 30. Similarly, the position of the gas-tight plug 10D on the surface is restricted with a margin by the same position restricting member 31 (not illustrated).

The four gas-tight plugs 10A, 10B, 10C, and 10D are arranged at positions corresponding to the four injector cups 3A, 3B, 3C, and 3D of the fuel delivery pipe 1 so that their axes coincide with the axes of the respective injector cups.

Therefore, in the case where the four injector cups 3A, 3B, 3C, and 3D of the fuel delivery pipe 1 are correctly attached without tolerance, when the fuel delivery pipe 1 is moved relatively in the direction of the base 30 of the gas-tightness inspection device by using a pressing mechanism (not illustrated) as illustrated by the arrow in FIG. 3, the gas-tight plugs are smoothly inserted into the respective opening ends of the injector cups to close the opening ends in the state where the positions of the four injector cups 3A, 3B, 3C, and 3D and the four gas-tight plugs 10A, 10B, 10C, and 10D coincide with each other.

However, since the four injector cups 3A, 3B, 3C, and 3D are attached to the fuel delivery pipe 1 by brazing or the like, variations in the attachment position within an allowable tolerance cannot be avoided. As a result, a situation may occur in which the positions of the four injector cups 3A, 3B, 3C, and 3D and the positions of the four gas-tight plugs 10A, 10B, 10C, and 10D do not coincide at the same time.

FIG. 3 illustrates the case where the gas-tight plug 10 whose base portion end illustrated in FIG. 2 has a spherical surface is used. However, it can also be substituted for that illustrated in FIG. 1. The gas-tight plug 10C for test fluid introduction having the fluid passage 19 penetrates the base 30 of the gas-tightness inspection device and is fixed to the base. On the other hand, since the base portion ends 20 of the remaining three gas-tight plugs 10A, 10B, and 10D are each formed into the spherical portion 22 with a large radius of curvature R, the axial direction of each of the gas-tight plugs 10A, 10B, and 10D is not fixed but comes into point contact with the base 30, and the base portion ends 20 of the gas-tight plugs 10A, 10B, and 10D are each supported by the position restricting member 31 with a degree of freedom to move on the base 30 when an external force is applied.

As described above, since the base portion ends 20 of the gas-tight plugs 10A, 10B, and 10D is each formed into the spherical portion 22 with a large radius of curvature R and is each formed in axial symmetry, they are substantially upright on the base in the initial state. Therefore, when the four injector cups 3A, 3B, 3C, and 3D of the fuel delivery pipe relatively move close to the base 30 of the gas-tightness inspection device, the opening ends 3a of the injector cups 3A, 3B, 3C, and 3D abut on the ends of the gas-tight plugs even if their positions vary slightly. At this time, the chamfered portion 17 formed by tapering existing in the end shoulder portion of the gas-tight plug causes the gas-tight plug and the injector cup to be easily engaged with each other. If the positions of the injector cups 3A, 3B, 3C, and 3D vary, some of the gas-tight plugs tilt slightly, thereby causing differences between their axial directions and the corresponding injector cup axis.

Since the gas-tight plugs 10A, 10B, and 10D can either tilt or move slightly above the base 30 as described above, when the four injector cups 3A, 3B, 3C, and 3D of the fuel delivery pipe move further close to the base 30 in the case where the axes do not coincide as such, they move so that the axes of the gas-tight plugs 10A, 10B, and 10D coincide with the axes of the injector cups 3A, 3B, and 3D. As a result, the axes of the injector cups 3A, 3B, and 3D coincide with the axes of the gas-tight plugs 10A, 10B, and 10D, and in that state, the gas-tight plug 10 is pressed along the axis of the injector cup 3 of the fuel delivery pipe.

It seems that since the bottom of the gas-tight plug 10C for test fluid introduction is not spherical and fixed to the base 30 and its position and axial direction are fixed accordingly, the axes may not be able to be aligned. However, since there is play at the attachment position of the fuel delivery pipe 1 to the device, it is possible to use it to align the axial direction of the injector cup 3C with the axial direction of the gas-tight plug 10C. In this state, the axial directions of the remaining injector cups may be aligned with the axes of the gas-tight plugs. In fact, that occurs at the same time, and the alignment can be achieved simply by pressing the four gas-tight plugs 10A, 10B, 10C, and 10D along the axes of the four injector cups 3A, 3B, 3C, and 3D of the fuel delivery pipe. In other words, the alignment can be achieved simply by pressing the gas-tight plugs against the injector cups of the fuel delivery pipe. It is noted that "alignment" used herein means making both axes coincide.

Figure 6:
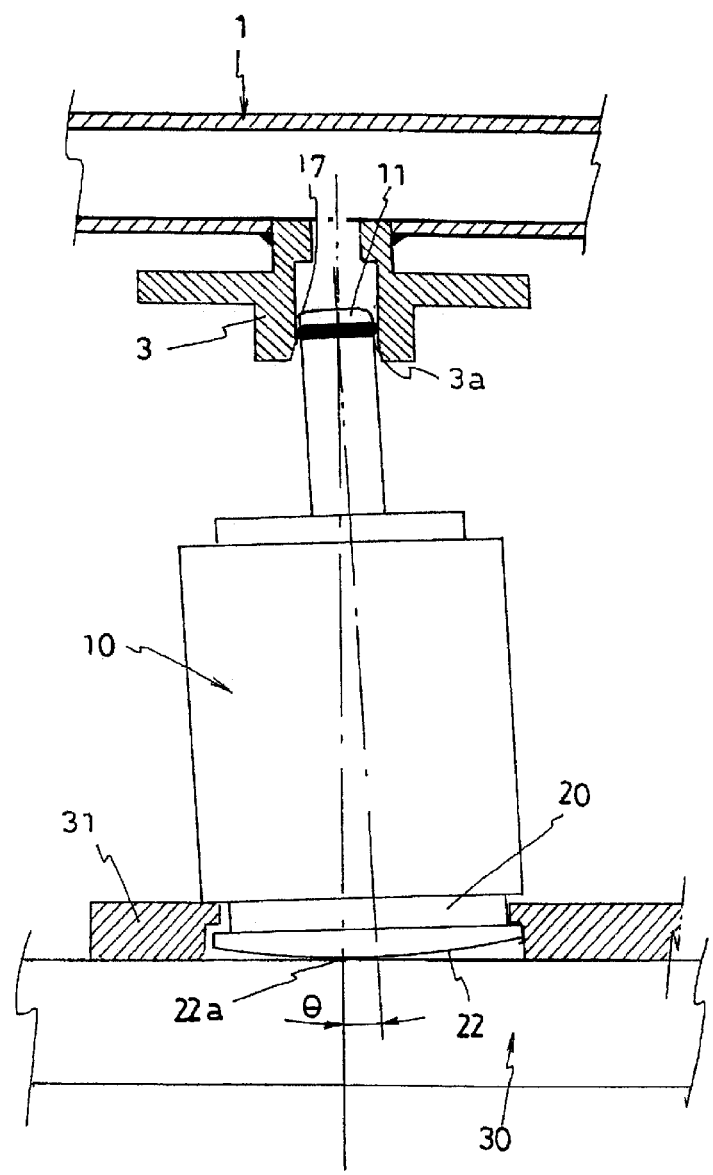
FIG. 6 is a side view for describing a function of aligning the axis of the injector cup of the fuel delivery pipe with the axis of the gas-tight plug.

The above-described automatic alignment function for the gas-tight plug according to the present invention will be described in more detail based on FIG. 6. FIG. 6 is a side view for describing the alignment function for the injector cup and the gas-tight plug when the position of the gas-tight plug in FIG. 2 does not coincide with the position of the injector cup of the fuel delivery pipe. In the case of the gas-tight plug 10 of FIG. 2, the base portion end 20 is formed into the spherical portion 22.

Although the gas-tight plug 10 is initially upright, when the injector cup 3 of the fuel delivery pipe 1 and the gas-tight plug 10 are first engaged with each other, the axis of the gas-tight plug 10 is tilted to the injector cup 3 side because the injector cup 3 is displaced. FIG. 6 illustrates a tilt of angle θ in a state where the right end of the opening end 3a of the injector cup 3 and the chamfered portion 17, which is formed by tapering, of the end shoulder portion of the piston 11 of the gas-tight plug 10. The base portion end 20 of the gas-tight plug 10 is formed into the spherical portion 22, so there is degree of freedom in the tilt angle, and the gas-tight plug 10 is easily tilted accordingly.

When the fuel delivery pipe 1 relatively moves further close to the gas-tight plug 10 side, in the arrangement of FIG. 6, a clockwise force or the like acts at the point of the chamfered portion 17 at the upper left corner of the piston 11 of the gas-tight plug 10, and attempts to move a contact point 22a between the spherical portion 22 of the base portion end of the gas-tight plug 10 and the base 30 in the left direction in FIG. 6, that is, in the direction of making the gas-tight plug 10 upright. At this time, since the base portion end of the gas-tight plug 10 is formed into the spherical portion 22, there is a degree of freedom in the tilt angle, and since there is only point contact with the base 30, there is also a degree of freedom to move on the surface of the base 30. Therefore, the contact point 22a of the spherical portion 22 at the base end of the gas-tight plug 10 moves so that the direction of the axis of the gas-tight plug 10 coincides with the axis of the injector cup under the force to rotate the gas-tight plug 10 clockwise. This process is repeated as the fuel delivery pipe 1 relatively moves close to the base 30 side, and alignment is performed by moving the gas-tight plug 10 so that the axis of the injector cup 3 and the axis of the gas-tight plug 10 coincide with each other.

Here, as illustrated in FIG. 2, when the total length of the gas-tight plug 10 in the axial direction is L and the radius of curvature of the spherical portion 22 of the base portion end is R, if the radius of curvature R is larger than the total length L of the gas-tight plug (L<R), the gas-tight plug automatically stands upright even when the gas-tight plug is tilted, resulting in the alignment function. However, in the case where the radius of curvature is too large and it can be regarded as a flat surface, the gas-tight plug cannot be tilted and the alignment function may not be able to be exhibited in some cases. Thus, there is a practical upper limit of the radius of curvature R but depending on the dimensional specifications of other members of the gas-tightness inspection device, and it is preferable that the practical upper limit be approximately smaller than twice L (R<2L).

Next, the alignment function for the injector cup and the gas-tight plug when the position of the gas-tight plug and the position of the injector cup of the fuel delivery pipe in FIG. 1 do not coincide will be described with reference to FIG. 7. In the case of the gas-tight plug 10 in FIG. 1, the base portion end 20 is formed into the circular flat portion 21.

Since the gas-tight plug 10 has the circular flat surface 21 formed into the base portion end, the gas-tight plug 10 is initially upright. However, when the injector cup 3 of the fuel delivery pipe 1 and the gas-tight plug 10 first engage with each other, the gas-tight plug 10 is tilted to the injector cup 3 side. FIG. 7 illustrates a tilt of angle θ in a state where the right end of the opening end 3a of the injector cup 3 and the chamfered portion 17, which is formed by tapering, of the end shoulder portion of the piston 11 of the gas-tight plug 10. Here, as the distance from the central axis to the peripheral edge of the circular flat portion 21 increases, the contact point 21a with the base 30 goes outside, so the rotational direction component of the force received by the gas-tight plug 10 decreases and as a result, the gas-tight plug 10 is not tilted. Therefore, the diameter W of the circular flat portion 21 needs to be smaller than 0.2 times the total length L of the gas-tight plug (W<0.2L).

Figure 7:
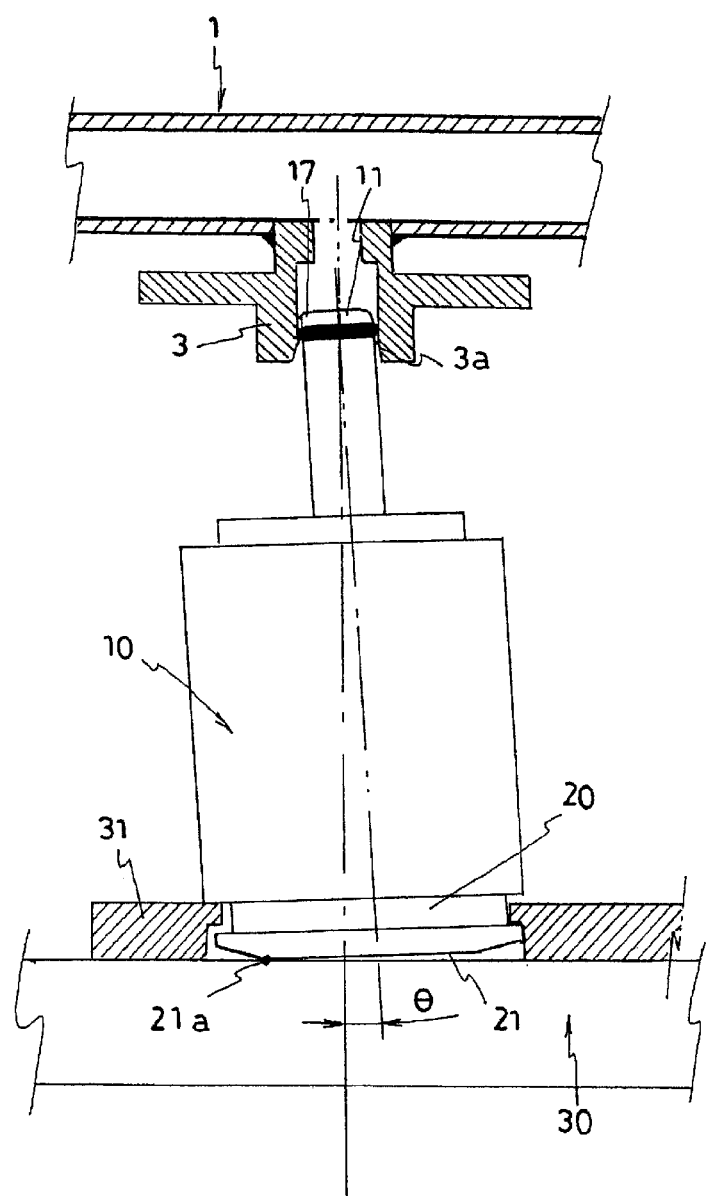
FIG. 7 is a side view for describing the function of aligning the axis of the injector cup of the fuel delivery pipe with the axis of the gas-tight plug.

When the fuel delivery pipe 1 relatively moves further close to the gas-tight plug 10 side with the gas-tight plug 10 tilted, in the arrangement of FIG. 7, a clockwise force or the like acts at the point of the chamfered portion 17 at the upper left corner of the piston 11 of the gas-tight plug 10, and attempts to move the contact point 21a between the peripheral edge of the circular flat portion 21 of the base portion end of the gas-tight plug and the base 30 in the left direction in FIG. 7, that is, in the direction of making the gas-tight plug 10 upright. At this time, since the circular flat portion 21 of the base portion end of the gas-tight plug 10 comes into contact at its peripheral edge, there is a degree of freedom in the tilt angle, and since there is only point contact with the base 30, there is also a degree of freedom to slightly move on the surface of the base 30. Therefore, the contact point 21a of the circular flat portion 21 of the base portion end of the gas-tight plug 10 moves to achieve the alignment so that the axial direction of the gas-tight plug 10 coincides with the axis of the injector cup. In order to return to the vertical state from the tilted state, the force acting on the gas-tight plug 10, that is, the resultant force of the normal force from the base 30, the self-weight at the center of gravity of the gas-tight plug 10, and the force received from the opening portion at the chamfered portion 17 of the gas-tight plug described above needs to act to return from the tilt. The condition is that, when the total length of the gas-tight plug in the axial direction is L and the diameter of the circular flat portion 21 of the base portion end is W (see FIG. 1), the diameter W of the circular flat portion is larger than 0.12 times the total length L of the gas-tight plug (0.12L<W). That is, if the diameter W of the circular flat portion 21 of the base portion end of the gas-tight plug 10 is too small than the total length L, the gas-tight plug 10 cannot be returned from its tilted state; if it is too large, the gas-tight plug 10 may not be tilted; and if 0.12L<W<0.2L, the gas-tight plug automatically stands upright to exhibit the alignment function even when it is tilted.

The embodiments of the gas-tight plug according to the present invention have been described above, but the present invention is not limited to the above-described embodiments at all, and various modifications and alterations are possible within the scope of the present invention as technical ideas defined in the claims, as a matter of course.

For example, in the above embodiments, examples in which the gas-tight plug according to the present invention is applied to the closing of the injector cup 3 of the fuel delivery pipe 1 are provided, but it goes without saying that the gas-tight plug can be applied to the closing of an opening portion formed in another hollow component.

In addition, the configuration of the gas-tight plug according to the present invention, for example, the configuration in which the piston 11, the cylinder 12, and the like are included and the attached O-ring 16 is compressed by the piston 11 and strongly pressed against the inner wall surface of the opening portion 51, is merely an example and is not limited to the configuration of the above-described embodiments.

INDUSTRIAL APPLICABILITY

According to the present invention, provided is a gas-tight plug that is attachable simply by pressing it against an opening portion of a hollow component, the gas-tight plug being inserted into the opening portion using the force of pressing to be automatically aligned so that if the positions of a plurality of opening portions vary within an allowable tolerance, the axial directions of all the opening portions and the axial directions of the respective gas-tight plugs are automatically caused to coincide. As a result, the gas-tight plug can be widely used as a device for closing an opening portion of an object to be inspected in a gas-tightness inspection for the object to be inspected such as a hollow component produced by brazing and the like, for example, a fuel delivery pipe to which an injector of a vehicle engine is attached.

REFERENCE SIGNS LIST

1 Fuel delivery pipe
2 Pipe body
3, 3A, 3B, 3C, 3D Injector cup
3a Opening end
4 Chamber
5 Leak detector
10, 10A, 10B, 10D Gas-tight plug
10C Gas-tight plug for test fluid introduction
11 Piston
11a End of piston
12 Cylinder
12a End of cylinder
13 Housing
14, 15 Working fluid port
16 O-ring
17 Chamfered portion
18 Notch
19 Fluid passage
20 Base portion end
21 Circular flat portion
21a Contact point
22 Spherical portion
22a Contact point
30 Base
31, 31a, 31b, 31c Position restricting member
32 Hook portion
L Total length of gas-tight plug
W Diameter of circular flat portion
R Radius of curvature of spherical portion

The invention claimed is:

1. A gas-tight plug of a gas-tightness inspection device, comprising an end portion which is hermetically attached to an opening portion of a hollow component by pressing the opening portion against the end portion by a pressing mechanism, wherein
 a contact part of a base portion end of the gas-tight plug contacts a base of the gas tightness inspection device and has a circular flat surface or a spherical surface coaxial with the end portion,
 if the contact part has the circular flat surface, the circular flat surface has a diameter W more than 0.12 times and less than 0.2 times a total length L of the gas-tight plug, and
 if the contact part has the spherical surface, the spherical surface has a radius of curvature R larger than the total length L of the gas-tight plug.

2. The gas-tight plug according to claim 1, wherein a chamfered portion is formed by tapering an end shoulder portion of the gas-tight plug.

3. The gas-tight plug according to claim 1, the gas-tight plug comprising:
 a housing; a cylinder held by the housing; a piston axially movable in the cylinder; and
 an O-ring fitted between an end of the piston and an end of the cylinder,
 wherein the piston is movable by the action of a working fluid, and when the piston moves so that the end of the piston presses the O-ring to the cylinder side, the O-ring is axially compressed and radially expanded.

4. The gas-tight plug according to claim 1, wherein the hollow component is a fuel delivery pipe, and the opening portion is an injector cup attached to the fuel delivery pipe by brazing.

* * * * *